United States Patent
Zhao et al.

(10) Patent No.: US 9,823,475 B2
(45) Date of Patent: Nov. 21, 2017

(54) HEAD-MOUNTED DISPLAY

(71) Applicant: Winbond Electronics Corp., Taichung (TW)

(72) Inventors: Kai-Wei Zhao, Kaohsiung (TW); Jui-Wen Pan, Hsinchu (TW); Yen-Lin Yeh, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 14/863,468

(22) Filed: Sep. 24, 2015

(65) Prior Publication Data
US 2016/0334624 A1 Nov. 17, 2016

(30) Foreign Application Priority Data
May 13, 2015 (TW) .............................. 104115227 A (51) Int. Cl.
G02B 27/01 (2006.01)
H04N 13/04 (2006.01)
F21V 8/00 (2006.01)

(52) U.S. Cl.
CPC ......... *G02B 27/0172* (2013.01); *G02B 6/003* (2013.01); *G02B 6/0031* (2013.01);
(Continued)

(58) Field of Classification Search
CPC .. G02B 27/0172; G02B 6/003; G02B 6/0031; G02B 6/0036; G02B 2027/0118; G02B 2027/0178; H04N 13/044
See application file for complete search history.

(56) References Cited

U.S. PATENT DOCUMENTS 4,497,860 A * 2/1985 Brady, Jr. ................ G02B 3/08
346/77 E
4,711,512 A * 12/1987 Upatnieks .......... G02B 27/0103
345/7
(Continued)

FOREIGN PATENT DOCUMENTS

| JP | 01107207 A | * | 4/1989 |
| TW | I484219 | | 5/2015 |
| WO | 2013062772 | | 5/2013 |

OTHER PUBLICATIONS

Kress et al., Diffractive and Holographic Optics as Optical Combiners in Head Mounted Displays, UbiComp/13, 2013, p. 1479.*
(Continued)

*Primary Examiner* — Peter Radkowski
(74) *Attorney, Agent, or Firm* — JCIPRNET (57) ABSTRACT

A head-mounted display having a first light incident region and a first light emitting region is provided. The head-mounted display includes a first light-guide plate, a first micro-display, a first reflector, a first collimating lens and a first filling structure. A first inner surface of the first light-guide plate has plural first hollow microstructures located in the first light emitting region. The first micro-display is located in the first light incident region and faces the first inner surface. The first reflector is located in the first light incident region, obliquely disposed at the first light-guide plate and faces the first micro-display. The first collimating lens is disposed between the first reflector and the first micro-display. The first filling structure fills in the first hollow microstructures, wherein a refractive index of the first filling structure is greater than a refractive index of the first light-guide plate.

8 Claims, 4 Drawing Sheets

(52) U.S. Cl.
CPC ......... *G02B 6/0036* (2013.01); *H04N 13/044* (2013.01); *G02B 2027/0118* (2013.01); *G02B 2027/0178* (2013.01)

(56) References Cited

U.S. PATENT DOCUMENTS

| | | | | |
|---|---|---|---|---|
| 5,661,603 A * | 8/1997 | Hanano | ................. | G02B 5/045 359/622 |
| 5,742,262 A * | 4/1998 | Tabata | ............... | G02B 27/0081 345/8 |
| 6,169,594 B1 * | 1/2001 | Aye | ........................ | G02B 5/045 349/196 |
| 6,185,043 B1 * | 2/2001 | Imamura | ................ | G02B 1/105 359/566 |
| 6,266,473 B1 * | 7/2001 | Saccomanno | ........ | G02B 6/0018 385/14 |
| 6,282,034 B1 * | 8/2001 | Onishi | ..................... | G02B 3/08 359/456 |
| 6,522,464 B2 * | 2/2003 | Kuwabara | .......... | G02B 27/4211 359/361 |
| 6,621,606 B2 * | 9/2003 | Takeyama | ................ | G02B 5/32 345/7 |
| 6,704,128 B2 * | 3/2004 | Takeyama | ................ | G02B 5/04 348/E5.028 |
| 6,825,987 B2 * | 11/2004 | Repetto | .............. | G02B 27/0172 345/6 |
| 6,829,095 B2 * | 12/2004 | Amitai | ................ | G02B 6/0018 359/629 |
| 6,839,173 B2 * | 1/2005 | Shimmo | .............. | G02B 5/1861 359/569 |
| 6,906,861 B2 * | 6/2005 | Tompkin | ................ | G02B 5/18 359/567 |
| 7,181,108 B2 * | 2/2007 | Levola | ................... | G02B 6/105 385/11 |
| 7,184,615 B2 * | 2/2007 | Levola | ................ | G02B 5/1828 385/10 |
| 7,477,453 B2 * | 1/2009 | Repetto | .............. | G02B 17/0856 359/630 |
| 7,525,728 B2 * | 4/2009 | Ogawa | ................ | H04N 5/7408 359/457 |
| 7,768,685 B2 * | 8/2010 | Hoshino | .............. | G02B 5/0252 359/15 |
| 7,796,329 B2 * | 9/2010 | Dobschal | ................. | F41G 1/30 359/1 |
| 7,936,519 B2 * | 5/2011 | Mukawa | .............. | G02B 27/0172 359/630 |
| 7,944,616 B2 * | 5/2011 | Mukawa | .............. | G02B 27/0172 359/630 |
| 8,189,263 B1 * | 5/2012 | Wang | ................. | G02B 27/0172 359/630 |
| 8,305,296 B2 | 11/2012 | Iba et al. | | |
| 8,320,032 B2 * | 11/2012 | Levola | ................. | G02B 5/1814 359/13 |
| 8,335,040 B2 * | 12/2012 | Mukawa | .............. | G02B 27/0172 345/8 |
| 8,570,242 B2 * | 10/2013 | Chosokabe | .......... | G02B 27/017 345/7 |
| 8,570,243 B2 * | 10/2013 | Mukawa | .............. | G02B 27/0176 345/207 |
| 8,570,244 B2 * | 10/2013 | Mukawa | .............. | G02B 27/0172 345/207 |
| 8,638,499 B2 * | 1/2014 | Mukawa | .................. | G02B 5/18 359/630 |
| 8,665,178 B1 * | 3/2014 | Wang | ................ | G02B 27/0172 345/7 |
| 8,666,212 B1 | 3/2014 | Amirparviz | | |
| 8,736,963 B2 * | 5/2014 | Robbins | .............. | G02B 27/0172 359/629 |
| 8,848,289 B2 | 9/2014 | Amirparviz et al. | | |
| 8,861,090 B2 * | 10/2014 | Mukawa | .............. | G02B 27/0103 359/630 |
| 8,907,865 B2 * | 12/2014 | Miyawaki | ............ | G02B 27/017 345/7 |
| 8,912,981 B2 * | 12/2014 | Mukawa | ............ | G02B 27/0172 345/207 |
| 8,928,984 B2 * | 1/2015 | Mukawa | .................. | G02B 5/18 359/630 |
| 8,988,315 B2 * | 3/2015 | Mukawa | .................. | G02B 5/32 345/8 |
| 9,075,232 B2 * | 7/2015 | Mukawa | .................. | G02B 5/18 |
| 9,189,829 B2 * | 11/2015 | Komori | ............... | G02B 27/017 |
| 9,201,242 B2 * | 12/2015 | Miyawaki | ........... | G02B 27/017 |
| 9,311,752 B2 * | 4/2016 | Chosokabe | .......... | G02B 27/017 |
| 9,329,325 B2 * | 5/2016 | Simmonds | ........... | G02B 6/0038 |
| 9,383,583 B2 * | 7/2016 | Mukawa | .................. | G02B 5/18 |
| 9,454,009 B2 * | 9/2016 | Mukawa | .............. | G02B 27/0172 |
| 9,488,757 B2 * | 11/2016 | Mukawa | ................. | G02B 3/12 |
| 2002/0015222 A1 * | 2/2002 | Kuwabara | ............ | G02B 5/1814 359/361 |
| 2002/0044359 A1 * | 4/2002 | Shimmo | ............... | G02B 5/1861 359/572 |
| 2002/0105726 A1 * | 8/2002 | Okuno | ................. | G02B 5/1895 359/569 |
| 2003/0090753 A1 * | 5/2003 | Takeyama | ................ | G02B 5/04 359/15 |
| 2003/0107785 A1 * | 6/2003 | Takeyama | ................ | G02B 5/32 359/15 |
| 2004/0004584 A1 * | 1/2004 | Hebert | ............... | G02B 27/0172 345/8 |
| 2004/0021945 A1 * | 2/2004 | Tompkin | ................. | G02B 5/18 359/566 |
| 2004/0032659 A1 * | 2/2004 | Drinkwater | ........... | F21V 33/006 359/558 |
| 2004/0085649 A1 * | 5/2004 | Repetto | .............. | G02B 27/0172 359/633 |
| 2004/0109234 A1 * | 6/2004 | Levola | ................. | G02B 5/1828 359/566 |
| 2005/0002611 A1 * | 1/2005 | Levola | ................... | G02B 6/105 385/37 |
| 2005/0270604 A1 * | 12/2005 | Drinkwater | ........... | F21V 33/006 359/2 |
| 2007/0070859 A1 * | 3/2007 | Hirayama | ................ | G02B 5/32 369/112.04 |
| 2007/0121208 A1 * | 5/2007 | Ogawa | ................ | H04N 5/7408 359/457 |
| 2007/0153395 A1 * | 7/2007 | Repetto | .............. | G02B 17/0856 359/630 |
| 2008/0152379 A1 * | 6/2008 | Saiki | ....................... | G03G 21/12 399/106 |
| 2008/0186547 A1 * | 8/2008 | Shimizu | ................... | G02B 5/32 359/13 |
| 2009/0051989 A1 * | 2/2009 | Dobschal | ................. | F41G 1/30 359/15 |
| 2009/0190222 A1 * | 7/2009 | Simmonds | ........... | G02B 6/0028 359/567 |
| 2010/0020374 A1 * | 1/2010 | Hoshino | ............... | G02B 5/0252 359/15 |
| 2010/0027084 A1 * | 2/2010 | Hoshino | ............... | G02B 5/0252 359/15 |
| 2010/0039796 A1 * | 2/2010 | Mukawa | .................. | G02B 5/18 362/97.1 |
| 2010/0046070 A1 * | 2/2010 | Mukawa | .............. | G02B 27/0176 359/480 |
| 2010/0067110 A1 * | 3/2010 | Hadad | ...................... | G02B 6/00 359/485.06 |
| 2010/0103078 A1 * | 4/2010 | Mukawa | .............. | G02B 27/0172 345/8 |
| 2010/0111472 A1 * | 5/2010 | DeJong | .............. | G02B 27/0081 385/31 |
| 2010/0157433 A1 * | 6/2010 | Mukawa | ................. | G03B 21/26 359/633 |
| 2010/0214659 A1 * | 8/2010 | Levola | ................. | G02B 5/1814 359/566 |
| 2010/0246004 A1 * | 9/2010 | Simmonds | ......... | G02B 27/0081 359/567 |
| 2010/0277803 A1 * | 11/2010 | Pockett | ............... | G02B 27/4277 359/567 |
| 2010/0321409 A1 * | 12/2010 | Komori | ............... | G02B 27/017 345/656 |

(56) References Cited

U.S. PATENT DOCUMENTS

| | | | | |
|---|---|---|---|---|
| 2011/0002143 A1* | 1/2011 | Saarikko | B29D 11/00663 | 362/611 |
| 2011/0019250 A1* | 1/2011 | Aiki | G02B 5/32 | 359/15 |
| 2011/0050547 A1* | 3/2011 | Mukawa | G02B 27/0176 | 345/8 |
| 2011/0050655 A1* | 3/2011 | Mukawa | G02B 27/0172 | 345/204 |
| 2011/0213664 A1* | 9/2011 | Osterhout | G02B 27/017 | 705/14.58 |
| 2011/0241975 A1* | 10/2011 | Mukawa | G02B 5/32 | 345/8 |
| 2011/0248904 A1* | 10/2011 | Miyawaki | G02B 27/017 | 345/7 |
| 2011/0248905 A1* | 10/2011 | Chosokabe | G02B 27/017 | 345/7 |
| 2012/0032874 A1* | 2/2012 | Mukawa | G02B 3/12 | 345/8 |
| 2012/0044571 A1* | 2/2012 | Mukawa | G02B 27/0103 | 359/630 |
| 2012/0044572 A1* | 2/2012 | Simmonds | G02B 6/0038 | 359/630 |
| 2012/0044573 A1* | 2/2012 | Simmonds | G02B 27/0172 | 359/631 |
| 2012/0287675 A1* | 11/2012 | Mukawa | G02B 5/18 | 362/618 |
| 2013/0069850 A1* | 3/2013 | Mukawa | G02B 27/0172 | 345/8 |
| 2013/0250431 A1* | 9/2013 | Robbins | G02B 27/144 | 359/633 |
| 2013/0328748 A1* | 12/2013 | Mukawa | G02B 27/0172 | 345/8 |
| 2013/0342914 A1* | 12/2013 | Mukawa | G02B 27/0176 | 359/630 |
| 2014/0022284 A1* | 1/2014 | Chosokabe | G02B 27/017 | 345/633 |
| 2014/0078591 A1* | 3/2014 | Mukawa | G02B 5/18 | 359/630 |
| 2014/0132631 A1* | 5/2014 | Komori | G02B 27/017 | 345/633 |
| 2014/0334010 A1* | 11/2014 | Mukawa | G02B 27/0103 | 359/630 |
| 2014/0347252 A1* | 11/2014 | Miyawaki | G02B 27/017 | 345/8 |
| 2015/0070772 A1* | 3/2015 | Mukawa | G02B 27/0172 | 359/630 |
| 2015/0109678 A1* | 4/2015 | Mukawa | G02B 5/18 | 359/630 |
| 2015/0109679 A1* | 4/2015 | Mukawa | G02B 5/32 | 359/630 |
| 2015/0269784 A1* | 9/2015 | Miyawaki | G02B 27/017 | 345/633 |
| 2016/0025985 A1* | 1/2016 | Komori | G02B 27/017 | 345/8 |
| 2016/0299345 A1* | 10/2016 | Mukawa | G02B 5/18 | |
| 2016/0334629 A1* | 11/2016 | Mukawa | G02B 27/0172 | |

OTHER PUBLICATIONS

Hung et al., "Demonstration of a Compact See-Through Head-Mounted Display with Light Guide Plate," The 20th International Display Workshops, Dec. 2013, pp. 1223-1224.

"Office Action of Taiwan Counterpart Application", dated Apr. 8, 2016, p. 1-p. 5.

* cited by examiner

HEAD-MOUNTED DISPLAY

CROSS-REFERENCE TO RELATED APPLICATION

This application claims the priority benefit of Taiwan application serial no. 104115227, filed on May 13, 2015. The entirety of the above-mentioned patent application is hereby incorporated by reference herein and made a part of this specification.

BACKGROUND OF THE INVENTION

Field of the Invention

The invention relates to a display device, and particularly relates to a head-mounted display.

Description of Related Art

A head-mounted display is generally implemented by fixing a micro-display and optical elements around a user's eyes through a pair of glasses, goggles or a helmet, etc., so as to guide an image beam from the micro-display to the user's eyes through the optical elements.

In order to avoid a situation that the head-mounted display shields the sight of the user and improve usage convenience and security of the head-mounted display, the head-mounted display is developed to have a design of a free surface type prism and a design of a light-guide plate. Regarding the design of the light-guide plate, some techniques suggest to embed periodic light splitting layers in the light-guide plate, and some techniques suggest to form a plurality of microstructures on a surface of the light-guide plate, and coat a reflection film on the microstructures, so as to achieve a goal of guiding the image beam out of the light-guide plate to the user's eyes. However, the above techniques have a high production barrier, and are hard to be implemented.

SUMMARY OF THE INVENTION

The invention is directed to a head-mounted display, which has a relatively low production barrier.

The invention provides a head-mounted display having a first light incident region and a first light emitting region. The head-mounted display includes a first light-guide plate, a first micro-display, a first reflector, a first collimating lens and a first filling structure. The first light-guide plate has a first outer surface and a first inner surface opposite to the first outer surface. The first inner surface has a plurality of first hollow microstructures located in the first light emitting region. The first micro-display is located in the first light incident region and faces the first inner surface. The first reflector is located in the first light incident region, obliquely disposed at the first light-guide plate and faces the first micro-display. The first collimating lens is located in the first light incident region and is disposed between the first reflector and the first micro-display. The first filling structure fills in the first hollow microstructures, where a refractive index of the first filling structure is greater than a refractive index of the first light-guide plate.

According to the above description, the light-guide plate has the hollow microstructures corresponding to a user's eye and the microstructures are capable of guiding the image beam out of the light-guide plate, and the hollow microstructures are filled with the filling structure with a higher refractive index. Therefore, after the image beam enters the first filling structure, the image beam is totally reflected at a boundary of the filling structure and the hollow microstructures and is then transmitted to the user's eye. Therefore, it is unnecessary to coat a reflection film to achieve the effect of guiding the image beam, such that the manufacturing feasibility of the head-mounted display is improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
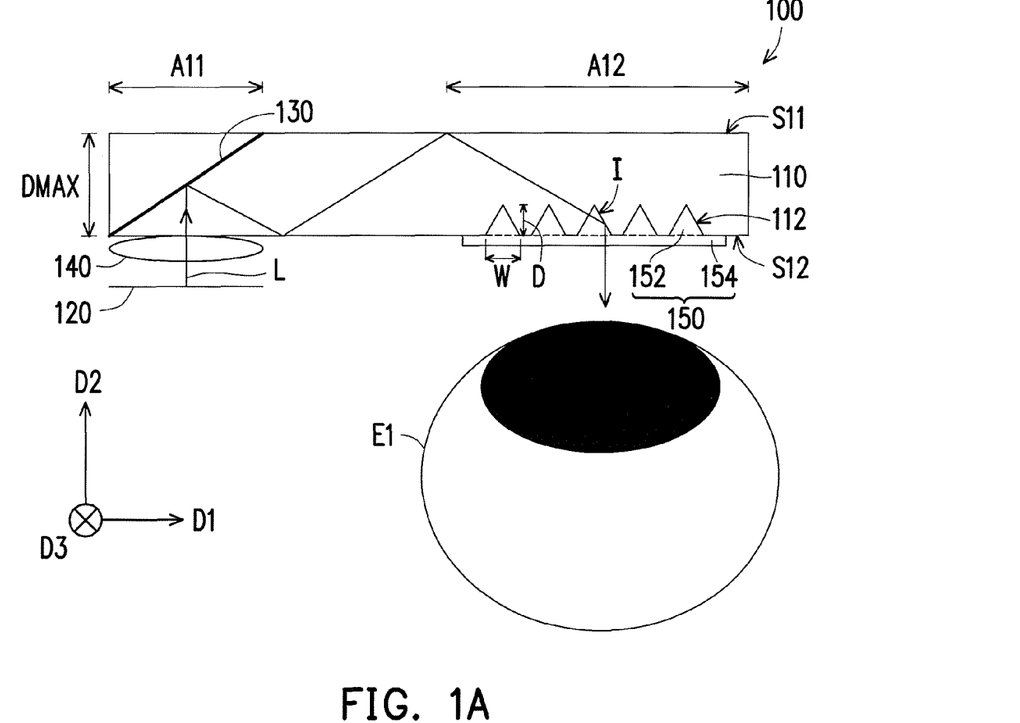
FIG. 1A is a schematic top view of a head-mounted display according to an embodiment of the invention.
Figure 1B:
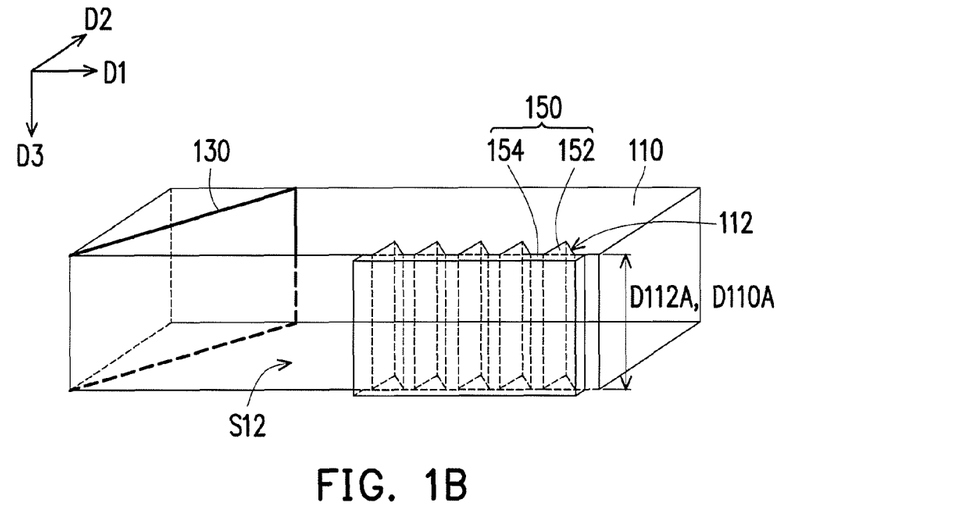
FIG. 1B is a schematic partial side view of the head-mounted display of FIG. 1A.

Referring to FIG. 1A and FIG. 1B, a head-mounted display 100 has a first light incident region A11 and a first light emitting region A12, wherein the first light emitting region A12 can be located at one side of the first light incident region A11. However, the relative relationship between the first light incident region A11 and the first light emitting region A12 can be changed according to an actual design requirement, which is not limited to those depicted in FIG. 1A.

The head-mounted display 100 includes a first light-guide plate 110, a first micro-display 120, a first reflector 130, a first collimating lens 140 and a first filling structure 150. The first light-guide plate 110 has a refractive index greater than 1, so as to guide a light beam therein in a total reflection manner. For example, a material of the first light-guide plate 110 can be resin, glass, polycarbonate (PC) or polymethylmethacrylate (PMMA), etc. with a refractive index greater than 1.

A shape of the first light-guide plate 110 can be a cuboid, and the first light-guide plate 110 may have a plurality of surfaces parallel to planes forming by two of a first direction D1, a second direction D2 and a third direction D3, wherein the first direction D1, the second direction D2 and the third direction D3 are perpendicular to each other. As shown in FIG. 1A, the first light-guide plate 110 has a first outer surface S11, and a first inner surface S12 opposite to the first outer surface S11. The first outer surface S11 and the first inner surface S12 are all parallel to a plane formed by the first direction D1 and the third direction D3. In an actual operation, the first inner surface S12 is located between the first outer surface S11 and a first eye E1 of a user.

The first inner surface S12 has a plurality of first hollow microstructures 112 located in the first light emitting region A12 and disposed corresponding to the first eye E1 of the user. The first hollow microstructures 112 are adapted to guide an image beam L transmitted in the first light-guide plate 110 out of the first light-guide plate 110. For example, each of the first hollow microstructures 112 can be a hollow triangular column-shaped microstructure, wherein the first hollow microstructures 112 can be arranged along the first direction D1, and each of the first hollow microstructures 112 can extend along the third direction D3.

Referring to FIG. 1B, a depth D112A of the first hollow microstructures 112 along the third direction D3 can be equal to a thickness D110A of the first light-guide plate 110. A width W of each of the first hollow microstructures 112 along the first direction D1, for example, ranges between 10 µm and 100 µm, and preferably ranges between 10 µm and 50 µm. Moreover, a depth D of each of the first hollow microstructures 112 along the second direction D2 can be smaller than a maximum thickness DMAX of the first light-guide plate 110. However, the actual size of the microstructures can be changed according to an actual design requirement, and is not limited to the above.

The first micro-display 120 is located in the first light incident region A11 and faces the first inner surface S12. In the present embodiment, the first inner surface S12 is located between the first micro-display 120 and the first outer surface S11, and the image beam L coming from the first micro-display 120 enters the first light-guide plate 110 from the first inner surface S12. According to different requirements, the first micro-display 120 can be a visible light micro-display or an infrared light micro-display, wherein the visible light micro-display can be a micro organic light-emitting display, a liquid crystal on silicon display (LCOS display) or other micro-display capable of providing a visible light.

The first reflector 130 is located in the first light incident region A11, obliquely disposed at the first light-guide plate 110 and faces the first micro-display 120. Specifically, the first reflector 130 is disposed on a transmission path of the image beam L entering the first light guide plate 110 from the first inner surface S12, and is configured to reflect the image beam L entering the first light guide plate 110, so as to transmit the image beam L toward the first hollow microstructures 112. It should be noticed that the first reflector 130 can be a reflection layer disposed on the surface of the light-guide plate 110, and illustration thereof is omitted.

The first collimating lens 140 is located in the first light incident region A11 and is disposed between the first reflector 130 and the first micro-display 120, and is adapted to collimate the image beam L emitted by the first micro-display 120 for transmitting into the first light-guide plate 110. The first collimating lens 140 may include a single lens or a plurality of lenses, and the lens can be a spherical lens, an aspheric lens, a cemented lens, or a combination thereof. The first collimating lens 140 can lean against the first inner surface S12 of the first light-guide plate 110 to achieve a better convergence effect, though the invention is not limited thereto.

The first filling structure 150 fills in the first hollow microstructures 112, where a refractive index of the first filling structure 150 is greater than the refractive index of the first light-guide plate 110, such that when the image beam L enters the first filling structure 150 and is transmitted to a boundary I of the first filling structure 150 and the first hollow microstructures 112, the image beam L is totally reflected and transmitted to the eye E1 of the user. In this way, the head-mounted display 100 is unnecessary to configure a reflection film, such that production feasibility of the head-mounted display 100 is improved.

In an actual manufacturing process, the material of the first light-guide plate 110 can adopt a material with the refractive index falling within a range from 1.3 to 1.55, and the material of the first filling structure 140 can adopt a material with the refractive index falling within a range from 1.7 to 2.5. Based on different materials, the respective manufacturing method of the first light-guide plate 110 and the first filling structure 150 and a bonding method of the first light-guide plate 110 and the first filling structure 150 can be different. For example, when the material of the first light-guide plate 110 adopts polymethylpentene (TPX) with the refractive index of about 1.46, the material the first filling structure 150 adopts a glass material (for example, S-NPH2 of OHARA company) with the refractive index of about 1.9, the first light-guide plate 110 and the first filling structure 150 can be respectively formed, and are then bonded to each other through an adhesive. In this case, the adhesive, for example, adopts a material with a refractive index the same with that of the first light-guide plate 110.

Moreover, the first filling structure 150 may include a plurality of first filling microstructures 152. Each of the first filling microstructures 152 is filled into one of the first hollow microstructures 112, and a shape of each of the first filling structures 152 is complementary with a shape of each of the first hollow microstructures 112. For example, each of the first filling microstructures 152 can be a triangular column-shaped microstructure.

The first filling structure 150 may selectively have a connection structure 154 connected to the first filling microstructures 152. The connection structure 154 is located at one side of the first filling microstructures 152, and the first filling microstructures 152 are located between the connection structure 154 and the first light-guide plate 110. In the present embodiment, the first inner surface S12 only has the first hollow microstructures 112 capable of containing the first filling microstructures 152, so that the connection structure 154 protrudes out of the first light-guide plate 110, and a connection surface between the first filling microstructures 152 and the connection structure 154 is flush with the first inner surface S12, though the invention is not limited thereto. In another embodiment, the first inner surface S12 may have a groove for containing the connection structure 154. In this case, the first filling structure 150 can be entirely filled in the first light-guide plate 110.

Figure 1C:
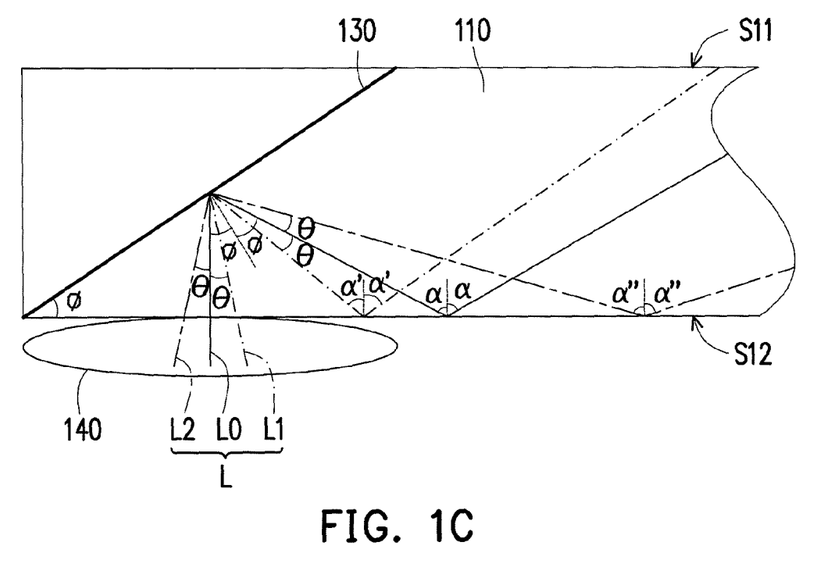
FIG. 1C to FIG. 1F illustrate transmission paths of light beams in the head-mounted display of FIG. 1A.
Figure 1D:
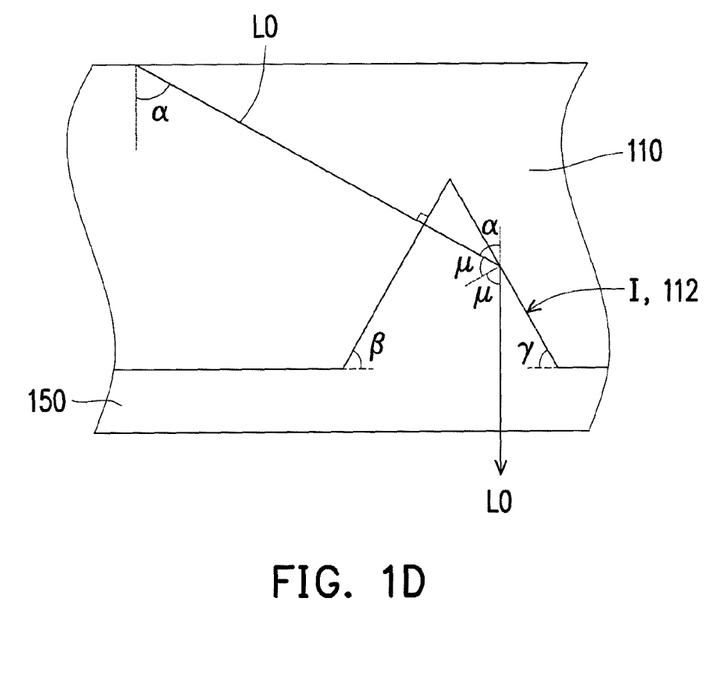

In an actual operation, an angle of the image beam L emitted from the head-mounted display 100 is related to the refractive index n1 of the first light-guide plate 110, the refractive index n2 of the first filling structure 150, an included angle φ between the first reflector 130 and the first inner surface S12, a half viewing angle θ of the image beam L coming from the first collimating lens 140, etc. Referring to FIG. 1C and FIG. 1D, the image beam L includes an image beam L0 normally incident to the first light-guide plate 110. According to FIG. 1C, it is known that an incident angle of the image beam L0 at the first reflector 130 is equal to the included angle φ. Moreover, an incident angle α of the image beam L0 at the first inner surface S12 and the first outer surface S11 is complied with a following equation (1).

$$2\phi = \alpha \qquad \text{equation (1)}$$

According to Snell's law and the total reflection condition, an equation (2) is deduced. Referring to FIG. 1D, if the image beam L0 is to be normally incident to the first hollow microstructure 112, and is totally reflected in an incident angle µ at the boundary I, the incident angle µ has to satisfy an equation (3). Moreover, an equation (4) is deduced according to FIG. 1D, and an equation (5) is derived according to equations (1) and (4).

$$\alpha \geq \sin^{-1}\frac{1}{n1} \qquad \text{equation (2)}$$

-continued $$\mu \geq \sin^{-1}\frac{n1}{n2} \quad \text{equation (3)}$$

$$\alpha + 2\mu = 180° \quad \text{equation (4)}$$

$$\mu = 90° - \phi \quad \text{equation (5)}$$

Referring to FIG. 1C, considering the half viewing angle θ of the image beam L coming from the first collimating lens 140, an incident angle of the image beam L1 at the first inner surface S12 and the first outer surface S11 is changed to α', and an incident angle of the image beam L2 at the first inner surface S12 and the first outer surface S11 is changed to α". An equation (6) is deduced according to FIG. 1C. Moreover, according to the Snell's law and the total reflection condition, the incident angles α' and α" have to satisfy an equation (7), and an equation (8) is derived according to the equation (6) and the equation (7).

$$\alpha' = 2\phi - \theta, \quad \text{equation (6)}$$
$$\alpha'' = 2\phi + \theta$$

$$\alpha' \geq \sin^{-1}\frac{1}{n1}, \alpha'' \geq \sin^{-1}\frac{1}{n1} \quad \text{equation (7)}$$

$$\phi \geq \frac{1}{2}\sin^{-1}\frac{1}{n1} + \frac{\theta}{2}, \phi \geq \frac{1}{2}\sin^{-1}\frac{1}{n1} - \frac{\theta}{2} \quad \text{equation (8)}$$

Figure 1E:
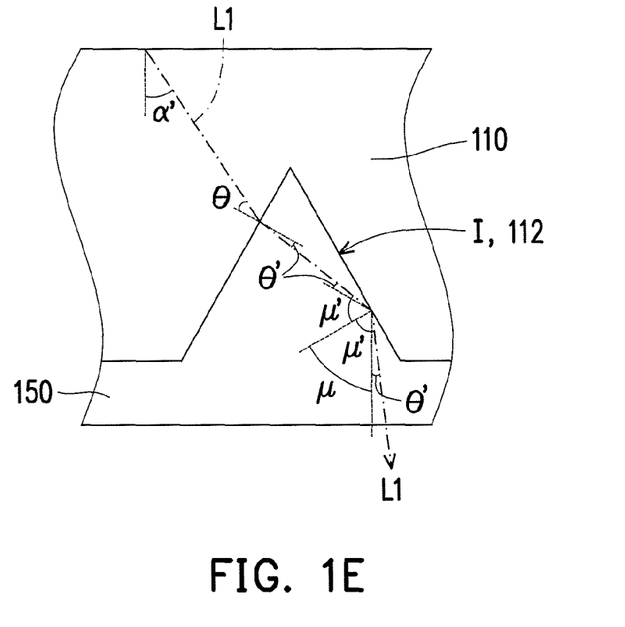
Figure 1F:
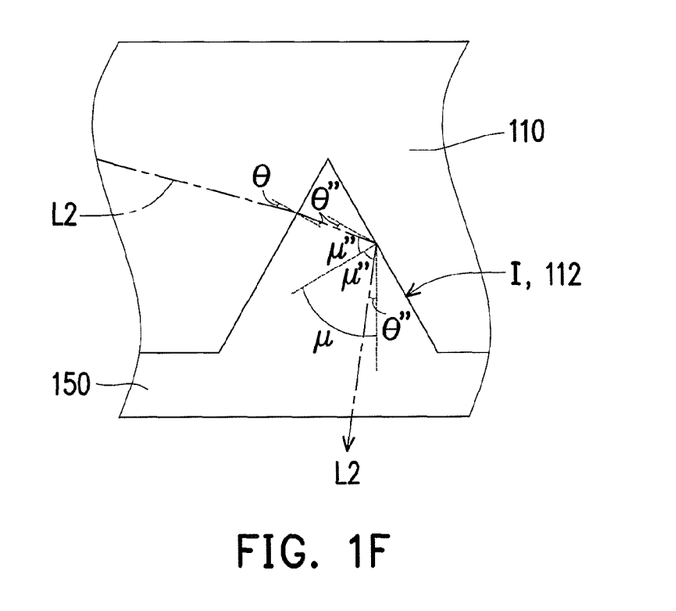

Referring to FIG. 1E and FIG. 1F, the incident angle of the image beams L1 and L2 entering the first filling structure 150 is just equal to the half viewing angle θ, an emitting angle of the image beam L1 is θ', and an emitting angle of the image beam L2 is θ". According to the Snell's law, the emitting angles θ' and θ" have to satisfy an equation (9). Moreover, an incident angle of the image beam L1 at the boundary I is μ', and an incident angle of the image beam L2 at the boundary I is μ". An equation (10) can be deduced according to FIG. 1E and FIG. 1F. Moreover, the incident angles μ' and μ" have to satisfy an equation (11) to implement the total reflection. An equation (12) can be deduced according to the equation (5), the equation (9) to the equation (11), and an equation (13) can be deduced according to the equation (8) and the equation (12). Moreover, according to FIG. 1D, it is deduced that a base angle β of the first hollow microstructure 112 close to the first reflector 130 plus twice of the incident angle μ is equal to 180 degrees, and α+2μ=180°, so that the base angle β is substantially equal to the incident angle α, i.e. the base angle β is substantially equal to (2φ). However, an actual value of the base angle β probably has an error of ±10 degrees due to process parameters. Moreover, according to FIG. 1D, it is also deduced that a base angle γ of the first hollow microstructure 112 away from the first reflector 130 is equal to the incident angle μ, and μ=−90°−φ. Therefore, the base angle γ is substantially equal to (90°−φ). However, an actual value of the base angle γ probably has an error of ±10 degrees due to process parameters.

$$\theta' = \sin^{-1}\left(\frac{n1}{n2}\sin\theta\right), \theta'' = \sin^{-1}\left(\frac{n1}{n2}\sin\theta\right) \quad \text{equation (9)}$$

$$\mu' = \mu + \theta', \mu'' = \mu - \theta'' \quad \text{equation (10)}$$

$$\mu' \geq \sin^{-1}\left(\frac{n1}{n2}\right), \mu'' \geq \sin^{-1}\left(\frac{n1}{n2}\right) \quad \text{equation (11)}$$

$$\phi \leq 90° - \sin^{-1}\left(\frac{n1}{n2}\right) + \sin^{-1}\left(\frac{n1}{n2}\sin\theta\right), \quad \text{equation (12)}$$

$$\phi \leq 90° - \sin^{-1}\left(\frac{n1}{n2}\right) - \sin^{-1}\left(\frac{n1}{n2}\sin\theta\right)$$

$$\frac{1}{2}\sin^{-1}\frac{1}{n1} + \frac{\theta}{2} \leq \phi \leq 90° - \sin^{-1}\left(\frac{n1}{n2}\right) - \sin^{-1}\left(\frac{n1}{n2}\sin\theta\right) \quad \text{equation (13)}$$

Figure 2:
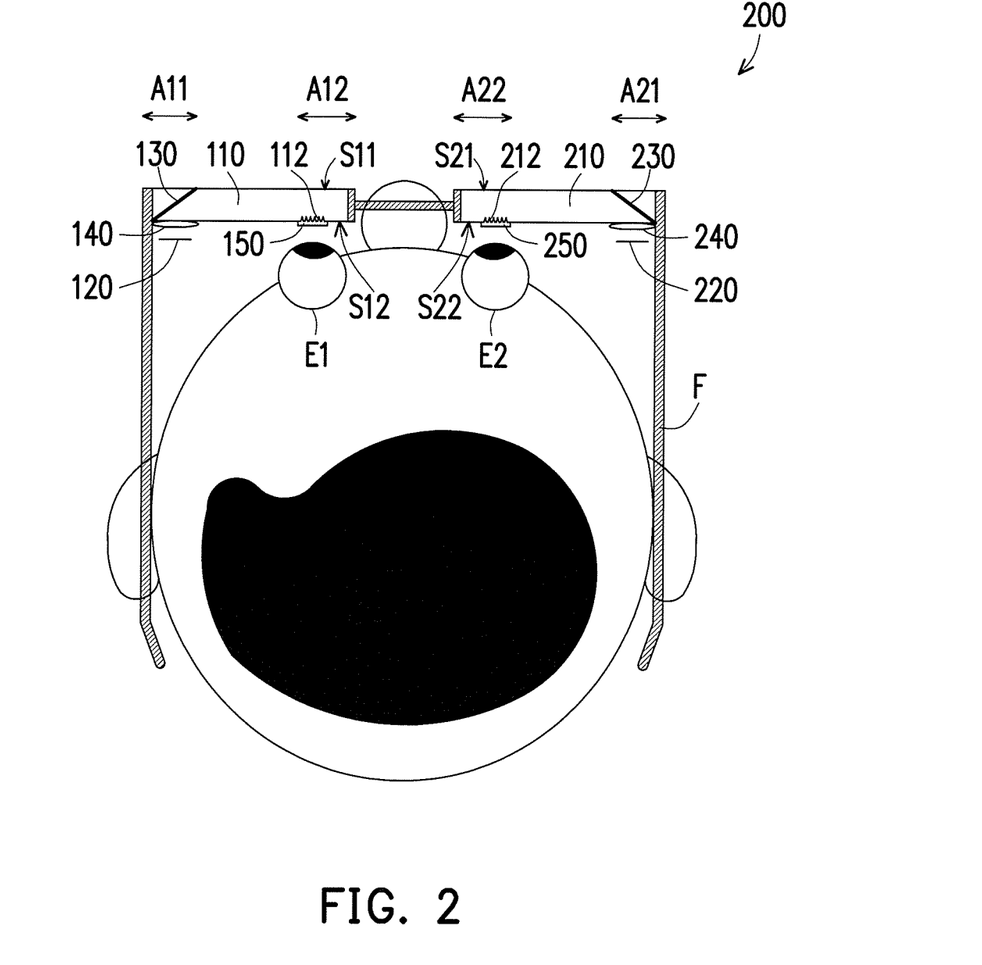
FIG. 2 is a schematic top view of a head-mounted display according to another embodiment of the invention.

A head-mounted display 200 of another embodiment illustrated in FIG. 2 is similar to the head-mounted display 100 of FIG. 1A, and similar components are denoted by the same referential numbers, and details thereof are not repeated. A main difference therebetween is that the head-mounted display 200 further has a second light incident region A21 and a second light emitting region A22, and the head-mounted display 200 further includes a second light-guide plate 210, a second micro-display 220, a second reflector 230, a second collimating lens 240 and a second filling structure 250.

The second light-guide plate 210 has a second outer surface S21 and a second inner surface S22 opposite to the second outer surface S21. The second inner surface S22 has a plurality of second hollow microstructures 212 located in the second light emitting region A22. The second micro-display 220 is located in the second light incident region A21 and faces the second inner surface S22. The second reflector 230 is located in the second light incident region A21, obliquely disposed at the second light-guide plate 210 and faces the second micro-display 220. The second collimating lens 240 is located in the second light incident region A21 and is disposed between the second reflector 230 and the second micro-display 220. The second filling structure 250 fills in the second hollow microstructures 212, where a refractive index of the second filling structure 250 is greater than a refractive index of the second light-guide plate 210.

Descriptions of the second light-guide plate 210, the second micro-display 220, the second reflector 230, the second collimating lens 240 and the second filling structure 250 may refer to related descriptions of the corresponding components in FIG. 1A, and details thereof are not repeated. It should be noticed that when the first micro-display 120 and the second micro-display 220 are all visible light micro-displays, the image beam output by the first micro-display 120 and the image beam output by the second micro-display 220 may have a parallax, such that the user wearing the head-mounted display device 200 may view a three-dimensional (3D) image. In other words, the head-mounted display device 200 can be used to implement 3D display. In the present embodiment, the head-mounted display device 200 may further includes a fixing device F for fixing the first light-guide plate 110, the first micro-display 120, the first reflector 130, the first collimating lens 140 and the first filling structure 150 near the first eye E1 of the user and fixing the second light-guide plate 210, the second micro-display 220, the second reflector 230, the second collimating lens 240 and the second filling structure 250 near a second eye E2 of the user. The fixing device F can be a pair of glasses, goggles, a helmet, or any device suitable for fixing the above components to user's head and taking off the same from the head, so as to achieve better flexibility and convenience.

In summary, the filling structure of the invention is filled in the hollow microstructures of the light-guide plate, and the refractive index of the filling structure is greater than the refractive index of the light-guide plate. Therefore, the image beam transmitted to the filling structure can be transmitted to the eyes of the user through total reflection. Therefore, the head-mounted display of the invention is unnecessary to coat a reflection film to achieve an effect of guiding the image beam, so as to improve manufacturing feasibility of the head-mounted display.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A head-mounted display, having a first light incident region and a first light emitting region, the head-mounted display comprising:
    a first light-guide plate, having a first outer surface and a first inner surface opposite to the first outer surface, wherein the first inner surface has a plurality of first hollow microstructures located in the first light emitting region and each of the first hollow microstructures is a hollow triangular column-shaped microstructure;
    a first micro-display, located in the first light incident region and facing the first inner surface, wherein the first inner surface is located between the first outer surface and the first micro-display;
    a first reflector, located in the first light incident region, obliquely disposed at the first light-guide plate and facing the first micro-display;
    a first collimating lens, located in the first light incident region, and disposed between the first reflector and the first micro-display; and
    a first filling structure, filling in the first hollow microstructures, wherein a refractive index of the first filling structure is greater than a refractive index of the first light-guide plate such that after an image beam enters the first filling structure, the image beam is reflected via total internal reflection at an interface between the first filling structure and the first hollow microstructures, and the reflected image beam passes through the first filling structure and is then transmitted to a user's eye, wherein an included angle between the first reflector and the first inner surface is $\phi$, and a half viewing angle of the image beam coining from the first collimating lens is $\theta$, the refractive index of the first light-guide plate is n1, the refractive index of the first filling structure is $$n2, \text{ and } \frac{1}{2}\sin^{-1}\left(\frac{1}{n1}\right) + \frac{\theta}{2} \le \phi \le 90° - \sin^{-1}\left(\frac{n1}{n2}\right) - \sin^{-1}\left(\frac{n1}{n2}\sin\theta\right).$$

2. The head-mounted display as claimed in claim 1, wherein the first filling structure has a plurality of first filling microstructures, each of the first filling microstructures is filled in one of the first hollow microstructures, and a shape of each of the first filling microstructures is complementary with a shape of each of the first hollow microstructures.

3. The head-mounted display as claimed in claim 1, wherein a base angle of each of the first hollow microstructures close to the first reflector is substantially equal to $(2\Phi)$, and a base angle of each of the first hollow microstructures away from the first reflector is substantially equal to $(90°-\Phi)$.

4. The head-mounted display as claimed in claim 1, wherein the refractive index of the first light-guide plate ranges between 1.3 and 1.55, and the refractive index of the first filling structure ranges between 1.7 and 2.5.

5. The head-mounted display as claimed in claim 1, wherein a width of each of the first hollow microstructures along an arranging direction of the first hollow microstructures ranges between 10 μm and 50 μm.

6. The head-mounted display as claimed in claim 1, wherein a depth of each of the first hollow microstructures along a direction perpendicular to the first inner surface is smaller than a maximum thickness of the first light-guide plate.

7. The head-mounted display as claimed in claim 1, further having a second light incident region and a second light emitting region, and the head-mounted display further comprising:
    a second light-guide plate, having a second outer surface and a second inner surface opposite to the second outer surface, wherein the second inner surface has a plurality of second hollow microstructures located in the second light emitting region;
    a second micro-display, located in the second light incident region and facing the second inner surface;
    a second reflector, located in the second light incident region, obliquely disposed at the second light-guide plate and facing the second micro-display;
    a second collimating lens, located in the second light incident region, and disposed between the second reflector and the second micro-display; and
    a second filling structure, filling in the second hollow microstructures, wherein a refractive index of the second filling structure is greater than a refractive index of the second light-guide plate.

8. The head-mounted display as claimed in claim 7, further comprising:
    a fixing device, fixing the first light-guide plate, the first micro-display, the first reflector, the first collimating lens and the first filling structure near a first eye of a user and fixing the second light-guide plate, the second micro-display, the second reflector, the second collimating lens and the second filling structure near a second eye of the user.

* * * * *